UNITED STATES PATENT OFFICE 3,843,498
RECOVERY OF ALUMINUM FLUORIDE
Thomas F. Payne, Columbia Falls, Mont., assignor to
The Anaconda Company, Louisville, Ky.
No Drawing. Filed Feb. 26, 1973, Ser. No. 335,494
Int. Cl. C01b 11/00; C01f 7/50; C22d 3/12
U.S. Cl. 204—67                                                                17 Claims

ABSTRACT OF THE DISCLOSURE

An aqueous solution containing fluorides (for example, hydrofluoric acid) is treated with alumina trihydrate at an elevated temperature to produce a complex aluminum hydroxide fluoride compound in solution. Commercial grade alumina is added to the solution to precipitate crystalline aluminum hydroxide fluoride hydrate therefrom. The precipitate is recovered and calcined in a non-oxidizing atmosphere to produce aluminum fluoride suitable for use in the electrolytic production of aluminum.

BACKGROUND OF THE INVENTION

1. Field of the Invention

This invention relates to the treatment of fluoride-containing aqueous solutions to recover the fluoride values thereof in the form of aluminum fluoride.

2. Prior Art

Many industrial processes produce gaseous effluents containing hydrogen fluoride and other fluoride compounds. These gaseous effluents must be treated to remove the fluorides therefrom before the gas is discharged to the atmosphere and also to recover the fluoride values of the gas to avoid un-economic waste of the fluorides. The most common procedure for recovering the fluoride content of effluent gases is to pass the gas through a tower or other apparatus where the gas is scrubbed with water to remove fluorides therefrom and produce an aqueous solution containing these fluorides. The fluoride-containing solution is in some cases treated to recover the fluoride values therefrom.

A number of processes have been proposed which follow this general procedure, the various processes using various scrubbing liquids or reagents to recover the fluoride values in forms suitable for various purposes. Most of these processes, however, require the concentration of fluorides in the scrubbing liquid to be relatively high (in the order of 10% or more HF or equivalent) in order for these processes to be effective and/or economical. Difficulty is encountered when the concentration of fluorides in the effluent gases and hence in the scrubbing liquid is relatively low, as is the case with the fluoride-containing gases evolved from the electrolytic cells in which alumina dissolved in molten cryolite is reduced to metallic aluminum.

It has heretofore been proposed in U.S. Pat. 3,533,924 to Arnfinn Ve that the fluoride content of dilute aqueous solutions containing as little as 3 to 5% HF be recovered by reacting the fluorides with aluminum hydroxide

(Al(OH)$_3$)

to produce a supersaturated solution of aluminum fluoride. This supersaturated solution is then treated with commercial alumina (Al$_2$O$_3$) to precipitate the aluminum fluoride from the solution as a co-precipitate of aluminum oxide and aluminum fluoride. The precipitate is dried and calcined to recover an aluminum fluoride product that can be employed as cell feed material in the electrolytic process for the production of aluminum. However, the process is not claimed to be useful for the treatment of solutions containing less than 3% fluorides.

The present process is addressed to the problem of recovering fluoride values from aqueous solutions containing as little as 0.02% fluoride, and in particular to the recovery of fluorides from the scrubbing tower water used to scrub fluorides from aluminum pot line gases and containing about 0.05% to 2.0% fluoride. The process is based on my discovery that most of the fluoride content of these very dilute solutions can be recovered by reacting the fluoride content of the solution with alumina trihydrate (Al$_2$O$_3$·3H$_2$O) to produce a complex aluminum hydroxide fluoride hydrate in solution, and then adding commercial grade alumina (Al$_2$O$_3$) to the solution to precipitate crystalline aluminum hydroxide fluoride hydrate (16Al(OH,F)$_3$·6H$_2$O) therefrom. The precipitate is then calcined to obtain an aluminum fluoride product that can be utilized as make-up feed material for the electrolyte in electrolytic production of aluminum metal.

SUMMARY OF THE INVENTION

In the process of the invention the fluoride content of a dilute fluoride-containing aqueous solution is reacted with alumina trihydrate at an elevated temperature to produce an equivalent or nearly equivalent quantity of complex aluminum hydroxide fluoride hydrate in the solution. Aluminum oxide is then introduced into the solution to precipitate crystalline aluminum hydroxide fluoride hydrate from the solution. The aluminum hydroxide fluoride hydrate precipitate is recovered, preferably by filtration, and is calcined to produce an aluminum fluoride product. The aluminum fluoride is admixed with aluminum oxide removed from the solution with the precipitate, and it advantageously is employed as make-up feed material for the electrolyte in the electrolytic production of aluminum.

The fluoride-containing aqueous solution may contain as little as 0.02% by weight fluoride, and advantageously it is scrubber water containing from about 0.05 to 2.0% fluoride that is obtained by scrubbing the effluent gases from an aluminum electrolytic cell. The amount of alumina trihydrate added to the aqueous solution may be sufficient to convert all of the fluoride in the solution to an equivalent quantity of the complex aluminum hydroxide fluoride compound, although in some instances, it has been advantageous to add more or less than the chemically equivalent amount. The reaction is advantageously carried out at a temperature of between about 140° F. and the boiling point with agitation of the solution for a period of up to about 3 hours. The aluminum oxide is advantageously commercial grade electrolytic cell feed alumina, and it may be added to the reaction solution after the reaction between the fluoride content of the solution and the added alumina trihydrate is substantially complete, or it may be added to the reaction solution at any time prior thereto so that the reaction and the precipitation of the crystalline product proceed simultaneously. The process results in the recovery of a significant portion, and in some cases up to 95%, of the fluoride content of the initial aqueous solution, and it may be used to recover a significant portion of the fluoride content of solutions containing as little as 0.02% fluoride. If there is an economically significant amount of fluoride remaining in the aqueous solution after reaction with the alumina trihydrate, the solution is advantageously recycled through the process. Fuoride that does not react in the first pass through the process is not lost but is largely recovered in subsequent passes through the process.

DETAILED DESCRIPTION

The process of the invention may be employed to recover the fluoride content of any fluoride-containing aqueous solution, and it is particularly suitable for the recovery of the fluoride content of dilute fluoride solutions such as those obtained when the effluent gases from an electrolytic cell for the production of aluminum are scrubbed with water. This scrubber water contains, typically, only about 0.05 to 2.0% fluoride (predominantly as HF) and therefore is difficult and expensive to treat by conventional process.

The fluoride-containing aqueous solution is first advantageously filtered to remove particulate matter therefrom. The filtered solution is then heated to an elevated temperature advantageously within the range from about 140° F. to the boiling point, and alumina trihydrate $$(Al_2O_3 \cdot 3H_2O),$$

preferably of commercial grade, is added to the solution and is reacted with the fluoride content of the solution to produce an equivalent or nearly equivalent quantity of aluminum hydroxide fluoride hydrate in solution. The amount of alumina trihydrate added to the aqueous solution may range from 5 to 150% of the chemically equivalent, or stoichiometric, amount, although 50 to 100% of the chemically equivalent amount is generally preferred. The use of less than the chemically equivalent amount reduces the overall percentage conversion of soluble fluoride in the initial solution to product crystals, but this can be economically important in industrial applications in order to limit equipment sizes. Shortening the reaction and crystallization times also has the effect of reducing the overall percentage conversion of soluble fluoride in the initial solution to product crystals. However, since unreacted fluoride will react on subsequent passes through the process, this is not detrimental. The reaction is carried out at a temperature of from 140° F. to the boiling point of the solution, with agitation, and preferably at a temperature of between about 175° and 190° F. The reaction requires up to 3 hours to proceed to substantial completion, depending on the agitation of the solution, its temperature and the concentration of fluorides therein.

On completion of the reaction between the fluoride content of the solution and the alumina trihydrate, aluminum oxide ($Al_2O_3$), and preferably commercial grade electrolytic cell feed alumina, is added to the solution to precipitate crystalline aluminum hydroxide fluoride hydrate ($16Al(OH,F)_3 \cdot 6H_2O$) therefrom. Alternatively, the aluminum oxide may be added to the aqueous solution before completion of the reaction between the fluoride content of the solution and the alumina trihydrate added thereto so that both the reaction and the precipiaion of he reaction product proceed more or less simultaneously. The aluminum oxide itself does not appear to react with the fluoride content of the solution as there is no significant loss in the amount of this compound that is added to the solution. Depending on the degree of calcination and other factors, some commercial alumina ores may contain compounds other than aluminum oxide, generally in very small amounts, and some of these other compounds may take part in the reaction. The precipitation of the aluminum hydroxide fluoride hydrate crystals is due possibly to an increase in the pH of the solution and possibly to the "salting out" effect that the addition of alumina to the solution may have. The temperature of the solution during the precipitation step is advantageously maintained between 140° F. and the boiling point. Precipitation begins immediately upon adding the alumina and may take 20 hours to complete although 3 to 4 hours is usually sufficient and economically advantageous.

The amount of alumina ore used for crystallization may range from less than one to about 20 weight portions of alumina for each one weight portion of theoretical aluminum fluoride that can be formed from the fluoride present in the solution, although weight ratios of from 1:1 to 5:1 are preferred for economic reasons.

The degree of completion of the process is monitored most readily by determining the fluoride concentration of the solution during the crystallization step. As the product precipitates out, the soluble fluoride concentration in the solution decreases.

Generally speaking, as the fluoride content of the initial solution increases, the percentage rate of conversion to aluminum fluoride product also increases. Also, in general terms, if any of the following four process parameters are increased, the percent conversion of the starting material to the product also increases: (1) percentage chemically needed alumina trihydrate; (2) reaction time between the initial solution and alumina trihydrate; (3) the weight ratio of alumina to theoretical aluminum fluoride; and (4) the crystallization time.

The precipitated aluminum hydroxide fluoride hydrate is separated from the solution and is recovered, advantageously by filtration. The filtered precipitate unavoidably contains some or all of the aluminum oxide added to the reaction solution, but this is not harmful for most of the intended uses of the ultimate product. Chemical and X-ray diffraction analysis of dry samples of the precipitate demonstrate that the precipitate comprises a mixture of aluminum oxide ($Al_2O_3$) and aluminum hydroxide fluoride hydrate ($16Al(OH,F)_3 \cdot 6H_2O$) together with possibly a trace of alumina trihydrate ($Al_2O_3 \cdot 3H_2O$) that did not react: The demonstrated presence of aluminum hydroxide fluoride hydrate in the precipitate indicates that this compound is the principal product of the reaction between the fluoride content of the initial solution and the alumina trihydrate added thereto.

The precipitated aluminum hydroxide fluoride hydrate product is calcined to drive off the water content and other volatiles present therein. The calcination is advantageously carried out at a temperature from about 750° F. to 1150° F. The thickness of the bed of the material being calcined should be at least ⅛″ and preferably thicker. Chemical and X-ray diffraction analysis of the calcined product demonstrate that it comprises essentially a mixture of aluminum fluoride and aluminum oxide that is suitable for use as make-up feed material for the electrolyte of an aluminum electrolytic cell.

The following examples are illustrative but not limitative of the practice of the invention.

Example I

A quantity of scrubber water was obtained from a scrubbing tower in which the effluent gases from an electrolytic aluminum pot line are scrubbed with water. A cationic coagulant was added to the scrubber water, and the scrubber water was filtered to remove particulate matter therefrom.

In a batch operation, 1500 milliliters (ml.) of scrubber water was placed in a reaction vessel and the fluoride content was adjusted to 0.218% fluoride or 3.27 grams (g.) fluoride. The fluoride-containing solution was heated to 180° F. and 4.37 g. of alumina trihydrate was added to the hot solution. The solution was vigorously agitated with a stirrer. After reacting the fluoride content of the solution with alumina trihydrate for 48 minutes, 14.46 g. of a commercial electrolytic cell feed alumina ore was added to the solution. The solution was stirred vigorously for 4 hours to insure completion of the reaction and to precipitate crystalline aluminum hydroxide fluoride hydrate therefrom. The precipitate was separated and recovered from the solution by filtration. The solution at this point had a fluoride content of 0.087% fluoride, indicating that about 60% of the fluoride content of the solution was converted to aluminum hydroxide fluoride hydrate and removed with the precipitate. The fluoride remaining in solution, about 1.305 g., is simply unreacted and a portion will react if subject to subsequent exposure to the process. Chemical and X-ray diffraction analysis demonstrated that the precipitate comprised a mixture of aluminum oxide and aluminum hydroxide fluoride hydrate together with a trace of alumina trihydrate that did not react. The precipitate was calcined at a temperature of about 1050° F. Chemical and X-ray diffraction analysis demonstrated that the calcined product comprised essentially a mixture of about 14.9 g. aluminum oxide and 2.87 aluminum fluoride.

Example II

In a continuous operation, filtered scrubber water having a fluoride content of 0.27% fluoride was introduced into a large supply tank. Scrubber water from the supply tank was introduced into a reaction vessel of 3 liter overflow capacity at the rate of 62.5 milliliters per minute (ml./min.) which was equivalent to the introduction of fluoride at the rate of 0.169 grams per minute (g./min.), and at the same time alumina trihydrate was introduced into the reaction vessel at the rate of 0.23 g./min. The reaction solution was heated to a temperature of 180° F. by an immersion heater and was vigorously stirred with a magnetic stirrer. After 48 minutes the reaction solution began to overflow the reaction vessel at the rate of 62.5 ml./min., the overflow being introduced into a crystallization tank having an overflow capacity of 15 liters. Commerical electrolytic cell feed alumina was introduced with the overflow solution at the rate of 0.746 g./min. and the mixture of liquid and particulate matter was maintained at a temperature of 180° F. while being vigorously stirred. After the reaction and the crystallization of the reaction product had proceeded for an additional 4 hours, the crystallization tank began to overflow. The overflow stream of liquid and suspended particulate matter was filtered, and the filtered solution was recycled through the system. The solution at this point had a fluoride content of 0.108%, indicating that about 60% of the fluoride content of the solution was converted to aluminum hydroxide fluoride hydrate. As before, a portion of the unreacted fluoride will react on a subsequent exposure to the process. Chemical and X-ray diffraction analysis of the precipitate collected on the filter demonstrated it comprised a mixture of aluminum oxide and aluminum hydroxide fluoride hydrate together with a trace of alumina trihydrate. The precipitate was calcined at a temperature of about 1050° F. Chemical and X-ray diffraction analysis demonstrated that the calcined product comprised essentially a mixture of aluminum oxide and aluminum fluoride, collected at the rate of 0.780 g./min. aluminum oxide and 0.147 g./min. aluminum fluoride.

I claim:
1. Process for producing aluminum fluoride from a fluoride-containing aqueous solution which comprises:
   introducing alumina trihydrate into said solution and reacting the fluoride content of said solution with said alumina trihydrate at an elevated temperature to produce a complex aluminum hydroxide fluoride hydrate compound in said solution,
   introducing aluminum oxide into the solution to precipitate aluminum hydroxide fluoride hydrate crystals from the solution,
   recovering said aluminum hydroxide fluoride hydrate precipitate from the solution, and
   calcining said precipitate to produce aluminum fluoride, combined in a mixture with said aluminum oxide.
2. Process according to claim 1 in which the aqueous solution contains at least about 0.02% fluoride.
3. Process according to claim 1 in which the fluoride-containing aqueous solution is scrubber water containing from about 0.05 to 2.0% fluoride obtained by scrubbing with water the effluent gases from an aluminum electrolytic cell.
4. Process according to claim 1 in which the aqueous solution is first filtered to remove particulate matter therefrom.
5. Process according to claim 1 in which the aqueous solution is heated to a temperature of between about 140° F. and the boiling point of the solution.
6. Process according to claim 1 in which the amount of alumina trihydrate added to the aqueous solution is within the range of from about 5% to 150% of that theoretically required to convert all of the fluoride in the solution to an equivalent quantity of the complex aluminum hydroxide fluoride hydrate.
7. Process according to claim 1 in which the amount of alumina trihydrate added to the aqueous solution is within the range of from about 50% to 100% of that theoretically required to convert all of the fluoride in the solution to an equivalent quantity of the complex aluminum hydroxide fluoride hydrate.
8. Process according to claim 1 in which the reaction between the fluoride content of the solution and the alumina trihydrate is carried out with agitation of the solution for a period of up to about 3 hours.
9. Process according to claim 1 in which the reaction between the fluoride content of the solution and the alumina trihydrate is carried out for a period of from 30 to 60 minutes before adding the aluminum oxide to the solution.
10. Process according to claim 1 in which the aluminum oxide used to precipitate the aluminum hydroxide fluoride hydrate from the solution is added in an amount of up to 20 weight portions of aluminum oxide per one weight portion of theoretical aluminum fluoride that can be produced from the fluoride present in the solution.
11. Process according to claim 10 in which the weight ratio of said added aluminum oxide to said theoretical aluminum fluoride is between about 1:1 and 5:1.
12. Process according to claim 1 in which the precipitation of the aluminum hydroxide fluoride hydrate product is carried out with agitation of the solution for a period of up to 20 hours.
13. Process according to claim 12 in which the precipitation of the aluminum hydroxide fluoride hydrate product is carried out for a period of 3 to 4 hours.
14. Process according to claim 1 in which the reaction between the fluoride content of the solution and the added alumina trihydrate is carried to substantial completion before adding the aluminum oxide to the solution.
15. Process according to claim 1 in which the aluminum oxide is added to the solution at approximately the same time as the alumina trihydrate is added thereto so that the reaction between the fluoride content of the solution and the alumina trihydrate and the precipitation of the crystalline aluminum hydroxide fluoride hydrate product proceed simultaneously.
16. Process according to claim 1 in which the calcined aluminum fluoride product is utilized as feed material for the electrolyte in the electrolytic production of aluminum.
17. Process according to claim 1 in which thickness of the bed of the precipitated product in the calcination step is greater than 1/8".

References Cited
UNITED STATES PATENTS

| | | | |
|---|---|---|---|
| 3,533,924 | 10/1970 | Ve | 204—67 |
| 3,457,150 | 7/1969 | Vancil et al. | 204—67 |
| 2,943,914 | 7/1960 | Moser | 204—247 X |
| 3,385,658 | 5/1968 | Broja et al. | 423—495 |

JOHN H. MACK, Primary Examiner

D. R. VALENTINE, Assistant Examiner

U.S. Cl. X.R.
423—472, 495